United States Patent [19]

Ryouki et al.

[11] Patent Number: 4,918,435
[45] Date of Patent: Apr. 17, 1990

[54] METHOD FOR PROCESSING ANIMATED GRAPHICS

[75] Inventors: Masato Ryouki; Akihito Shibata, both of Nagoya, Japan

[73] Assignee: Kabushiki Kaisha Okuma Tekkosho, Nagoya, Japan

[21] Appl. No.: 281,901

[22] Filed: Dec. 6, 1988

Related U.S. Application Data

[63] Continuation of Ser. No. 712,232, Mar. 15, 1985, abandoned.

[30] Foreign Application Priority Data

Mar. 30, 1984 [JP] Japan .................................. 59-63965

[51] Int. Cl.⁴ .............................................. G09G 1/16
[52] U.S. Cl. .................... 340/747; 340/724; 340/723; 340/725
[58] Field of Search ............... 340/747, 723, 724, 725, 340/703, 798, 799

[56] References Cited

U.S. PATENT DOCUMENTS

| Re. 31,200 | 4/1983 | Sukonick et al. | 340/709 X |
| 4,070,710 | 1/1978 | Sukonick et al. | 340/724 X |
| 4,116,444 | 9/1978 | Mayer et al. | 340/709 X |
| 4,425,559 | 1/1984 | Sherman | 340/747 |
| 4,439,761 | 3/1984 | Fleming et al. | 340/747 X |
| 4,559,533 | 12/1985 | Bass et al. | 340/747 |
| 4,570,161 | 2/1986 | Kummer et al. | 340/709 X |
| 4,642,790 | 2/1987 | Minshull et al. | 340/747 |
| 4,654,651 | 3/1987 | Kishi et al. | 340/724 |

*Primary Examiner*—Gerald Brigance
*Attorney, Agent, or Firm*—Wenderoth, Lind & Ponack

[57] ABSTRACT

In a method for processing animated graphic in which a graphic symbol is displayed on a displaying unit on the basis of data preliminarily set in a video RAM and the displayed graphic symbol is totally shifted by a predetermined amount, the graphic symbol to be shifted is initially described in an original graphics storing area and a graphic symbol transfer area is provided so as to include the graphic symbol initially described in the original graphics storing area and includes a non-display area at the outer periphery thereof. The data corresponding to the transfer area is then transferred into the video RAM the transferred data including the sizes or dimensions and the coordinate of the reference point of the transfer area.

8 Claims, 6 Drawing Sheets

METHOD FOR PROCESSING ANIMATED GRAPHICS

This application is a continuation of now abandoned application Serial No. 712,232, filed Mar. 15, 1985, abandoned.

BACKGROUND OF THE INVENTION

This invention relates to a method for processing animated graphics to change or shift a displayed position of a graphic symbol having fixed sizes or dimensions.

In a prior art technique of this field, when it is desired to parallelly shift the displayed position of a graphic symbol FS consisting of about one hundred straight lines as shown in FIG.1 by five dots in an upper direction and five dots in a leftward direction, it is necessary to erase an old graphic symbol OF and display and process a new graphic symbol NF at a new display position of the cathode ray tube (CRT) display of graphic dot information described on a video RAM ( Random Access Memory ) as shown in FIG.2. In other words, it was necessary to interpret and excecute commands for erasing the respective lines for the old graphic symbol OF and for displaying the respective lines for the new graphic symbol NF.

FIG.3 is a block diagram showing a system in a prior art for processing animated graphics of the type described above, in which a graphic processing command unit 1 operates so as to read out information regarding the respective lines constituting the graphic symbol FS for the animation graphic, for example, coordinate values of the start and terminal points, kinds of the lines and the like, from a symbol line data registering unit 10, to form a command LE in case of commanding the description of the lines or erasing the symbol, and to transfer the command LE to a graphic processing control unit 2. The graphic processing control unit 2 interprets the line description command LE or erase command LE prepared in and transferred from the graphic processing command unit 1 with respect to the respective lines, so as to thereby convert the coordinate on the screen of a CRT display unit 6 into an address of a video RAM 4 which is a memory element for storing the display graphic and to perform a clipping processing for the designated area as occasion demands. The command LE subjected to these processings is converted into concrete dot information in a line describing unit 30 and the graphic dot information is stored at a corresponding position in the video RAM 4. In case of the command LE for erasing lines, the erasing command LE is convertedinto concrete dot information in a line erasing unit 31 in place of the line describing unit 30 and stored in the video RAM 4. The graphic information thus stored in the video RAM 4 is converted into a graphic display signal suitable for the CRT display unit 6 as the graphic display unit in a video signal forming unit 5 and then transferred into the CRT display unit 6 so as to thereby display the graphic symbol on the screen.

As described hereinabove, with the conventional animated graphic processing method, two steps were required for erasing the old graphic symbol and for displaying the new graphic symbol on a new display position, so that the delay for the graphic display was noticeable and it was impossible to realize the smooth shift or display of the graphic symbol.

SUMMARY OF THE INVENTION

An object of this invention is to eliminate defects or disadvantages in the prior art and to provide a method for processing animated graphics capable of smoothly shifting graphic symbols, particularly for shifting complicated graphic symbols in which colors or patterns are provided at a high speed.

This and other objects of this invention can be achieved, according to this invention, by providing a method for processing animated graphics of the type in which a graphic symbol is displayed on the basis of data preliminarily set in a video RAM and the displayed graphic symbol in totally shifted by a predetermined distance, wherein an original graphic storing area is provided for initially describing a graphic symbol to be shifted; a graphic symbol transfer area is provided so as to includes the graphic symbol initially described in the original graphic storing area and includes a non-display area at the outer periphery thereof, and the data corresponding to the transfer area is transferred into the video RAM to carry out an animated graphic processing.

The nature, principle and utility of the invention will become more apparent from the following detailed description when read in conjunction with the accompanying drawings.

BRIEF DESCRIPTION OF THE DRAWINGS

In the accompanying drawings.

DESCRIPTION OF THE PREFERRED EMBODIMENT

This invention will first be summarized as follows in connection with the prior art technique described hereinbefore.

According to this invention, the animated graphics is processed by shifting the entire graphic symbol FS by the predetermined distance or amount together with the display symbol FS by the predetermined distance or amount together with the display from the graphic symbol FS on the CRT display unit 6 on the basis of the data from the video RAM 4. In the method of this invention, an original graphics storing area is provided in which the graphic symbol FS which is to be shifted and display is initially described and a transfer area is also provided which includes the graphic symbol FS now processed and includes a non-displayed area on its periphery, and the transfer area is then transferred to the video RAM 4 to carry out the animated graphic processing therein.

Figure 1:
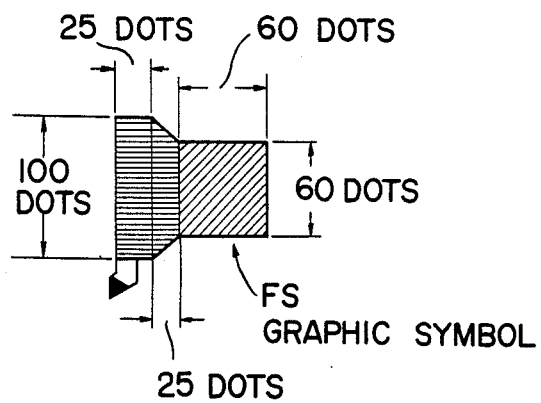
FIGS.1 and 2 are views for explaining an animated graphic processing method.
Figure 2:
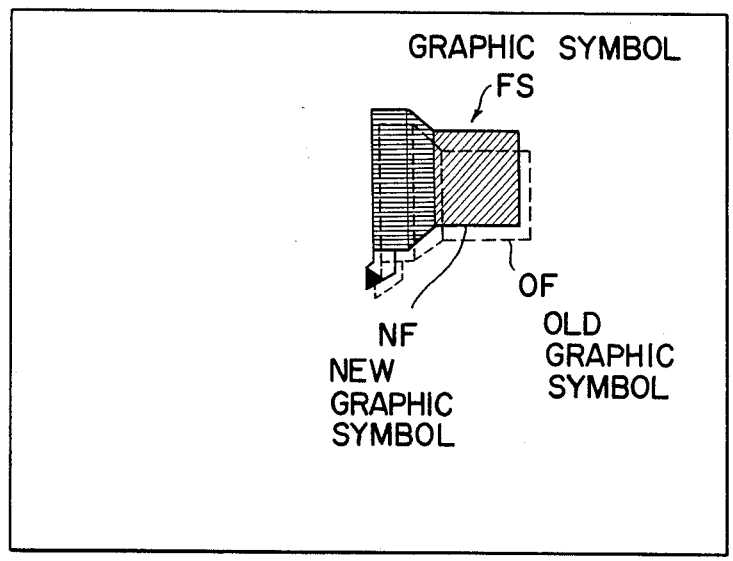
Figure 3:
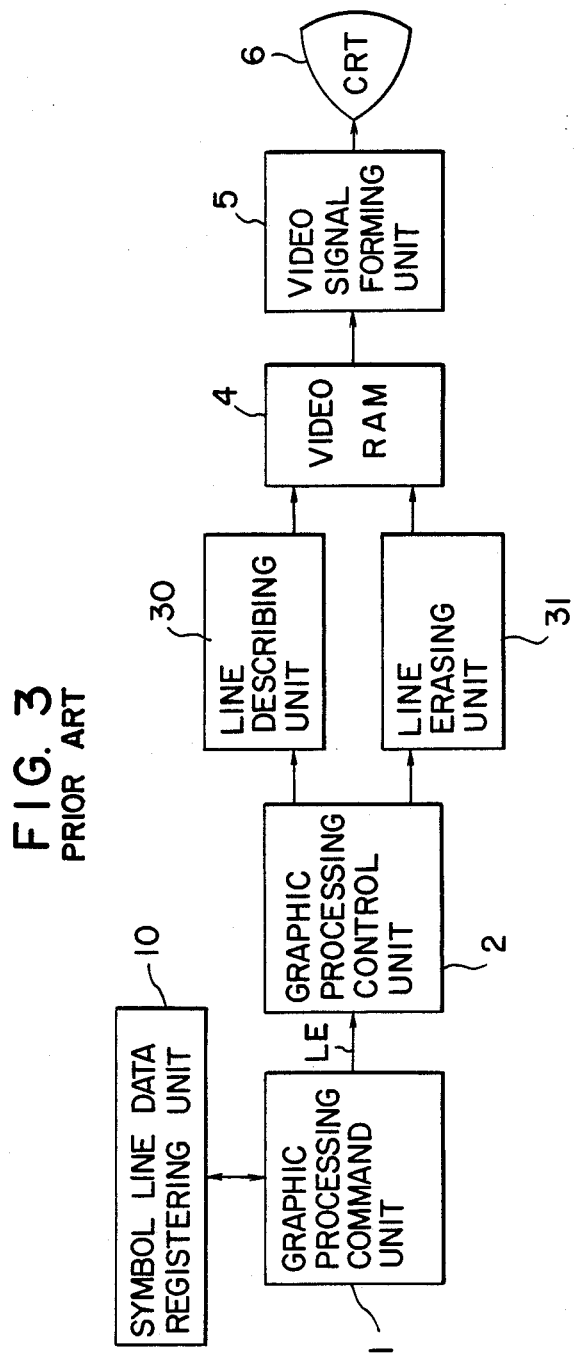
FIG.3 is a block diagram showing the construction of a device for carrying out the conventional animated graphic processing method.
Figure 4:
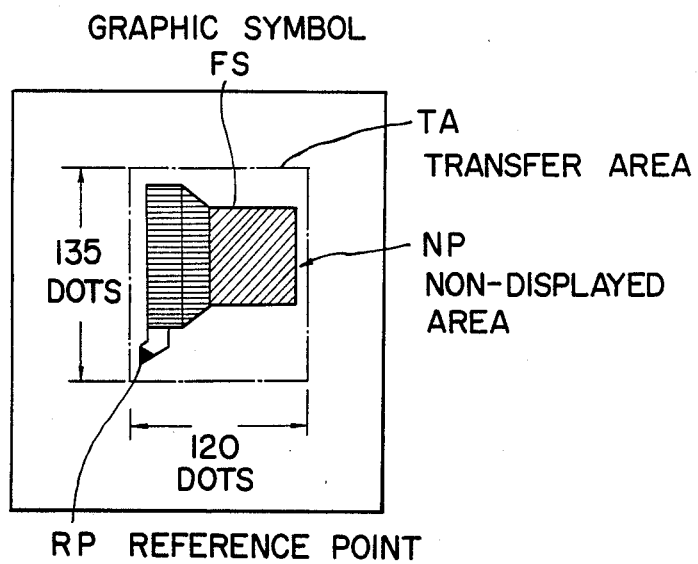
FIGS.4 and 5 are views for explaining an animated graphic processing method of this invention corresponding to FIGS.1 and 2, respectively.
Figure 5:
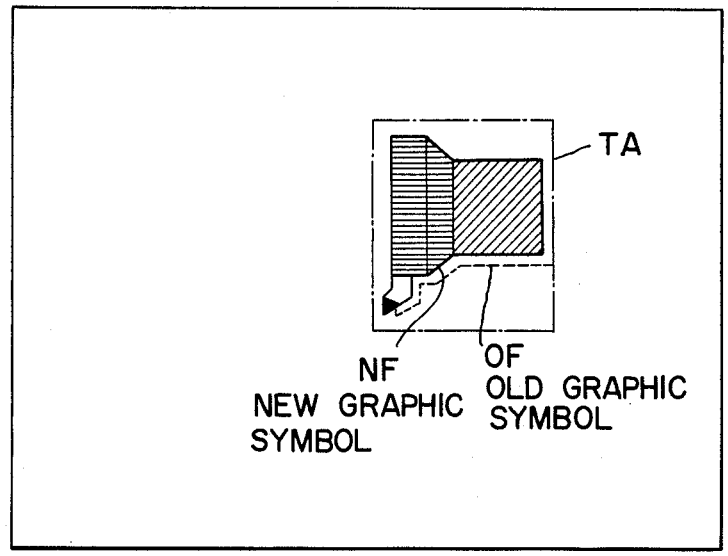

Namely, in detail, as shown in FIG.4, a transfer area TA of 135×120 dots, for example, having non-displayed areas NP of 5 dots, for example, respectively on the periphery of the graphic symbol FS to be shifted and displayed is set in the original graphics storing area, and a coordinate is set in which an optional point of the transfer area TA, for example, a blade point of a tool is set as a reference point RP for the graphic symbol FS. When the animated graphic processing is carried out, the entire transfer area TA data is transferred into the video RAM 4 by designating the transferring position of the reference point RP of the transfer are TA to the desired address in the video RAM 4, whereby as shown in FIG.5, on the graphic display unit is realized the animated graphic processing in which the old graphic symbol OF is shifted to the new graphic symbol NF. Namely, the respective graphic dot information of the old graphic symbol OF are converted to either one of the graphic dot information regarding the new graphic symbol NF and the non-displayed area NP by transferring the graphic dot information to the new display position, and as a result of this conversion, the old graphic symbol OF is erased. For example, when it is necessary to execute the parallel shift of the graphic symbol by more than five dots, the parallel shift can be done by repeating several times the animated graphic processing in the manner described above.

Figure 6:
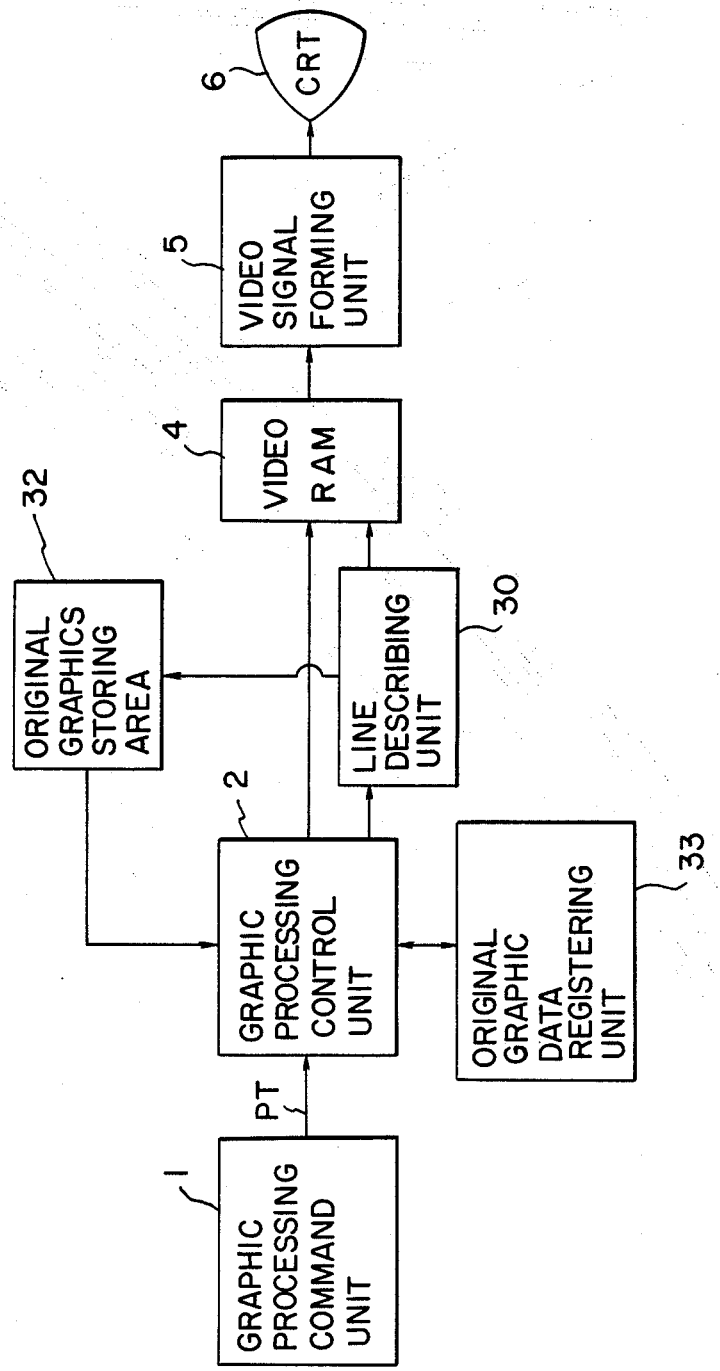
FIG.6 is a block diagram showing the construction of a device for carrying out the method according to this invention.

FIG.6 shows a block diagram of one example of a system of executing the method of this invention. A graphic processing command unit 1 instructs so as to store the concrete graphic dot information of the graphic symbol FS to be processed as an animated graphic in an original graphics storing area 32 ghrough the graphic processing control unit 2 and the line describing unit 30 as a completed graphic such as the graphic symbol FS shown in FIG.4. The graphic processing command unit 1 then instructs so as to store sizes or dimensions of the transfer area TA completely including the graphic symbol FS and further including the peripheral non-displayed area NP and the data such as coordinate value of the reference point RP for transferring the graphic symbol FS necessary for the animated graphic processing into an original graphic data registering unit 33 through the graphic processing control unit 2. The update of the coordinate of the reference point RP of the original graphics and the transfer of the entire graphic symbol FS, i.e. the transfer area TA into the video RAM 4 are executed, and in this execution, the graphic processing control unit 2 updates the contents of the the original graphic data registering unit 33 as occasion demands and transfers the graphic dot information in the designated area from the original graphics storing area 32 into the video RAM 4, so as to thereby form a display signal in the video signal forming unit 5 and then display the graphic symbol on the CRT display unit 6.

Figure 7:
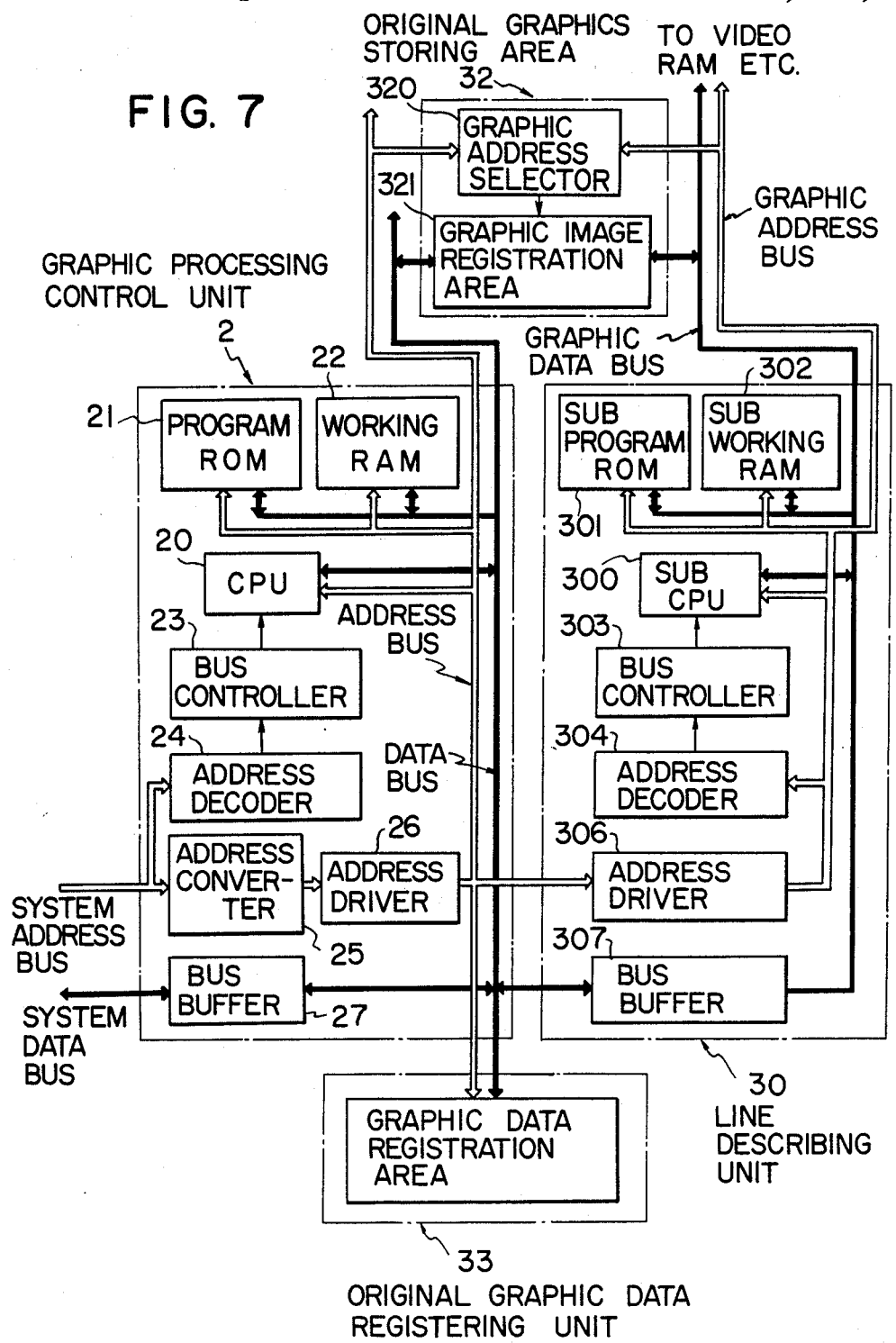
FIG.7 is a detailed block diagram showing a graphic processing control unit, a line describing unit and an original graphics storing area which constitute the device shown in FIG.6.
Figure 8:
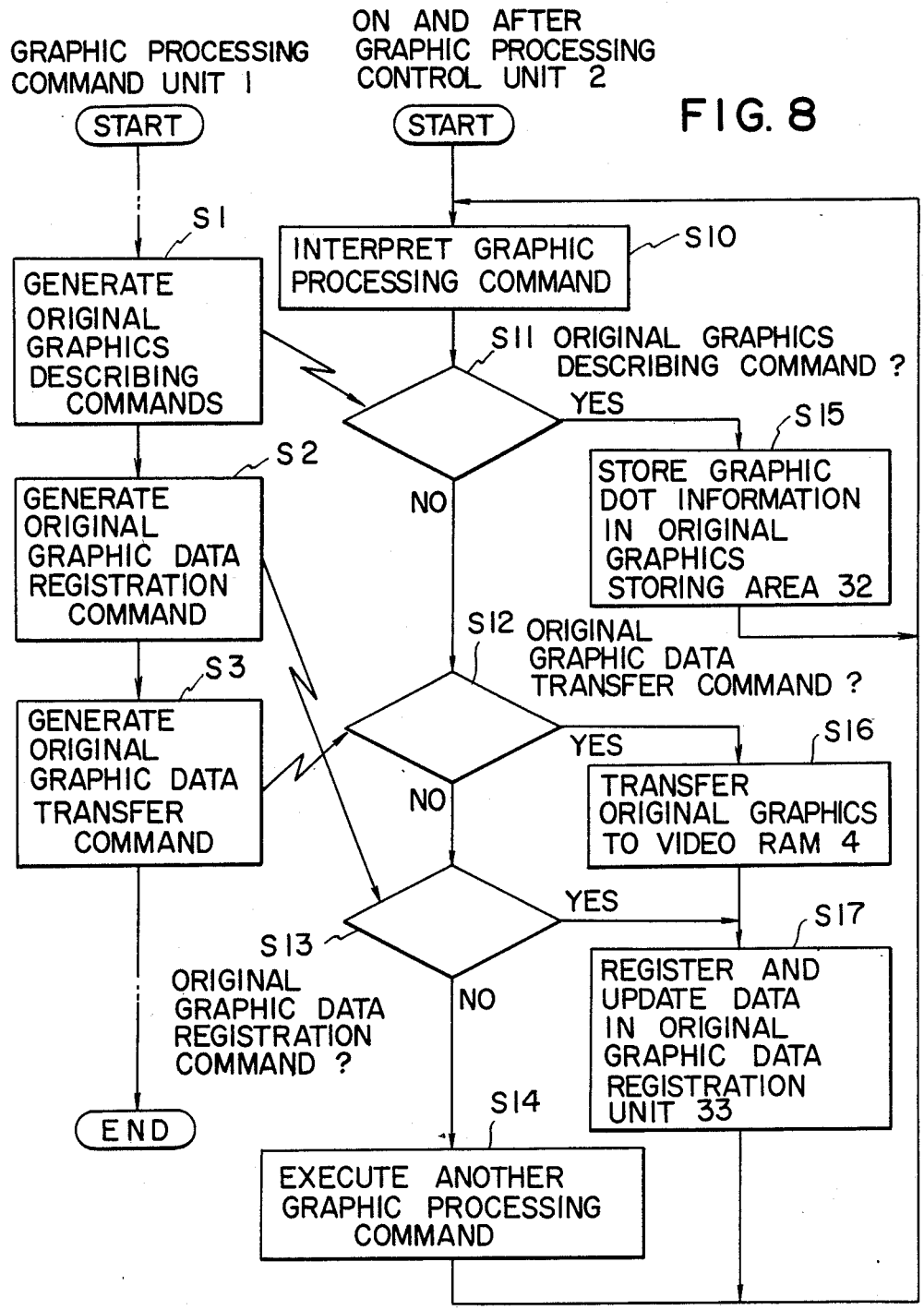
FIG.8 shows flowcharts for the processings of a graphic processing command unit and on and after the graphic processing control unit constituting the device shown in FIG.6.

FIG.7 is a detailed block diagram showing the construction of the graphic processing control unit 2, the line describing unit 30 and the original graphics storing area 32, and FIG.8 shows flowcharts representing the operation of the graphics processing command unit 1 and the operation related to the graphic processing command unit 1 which is executed by the graphic processing control unit 2 and the flow of the steps.

The graphic processing control unit 2 interprets the graphic processing command and generates parameter data necessary for the graphic processing. The graphic processing command from the graphic processing control unit 2 is stored in a command buffer provided for a working RAM 22 through a system address bus and a system data bus, and in this procedure, the system address is converted into an inner address of the graphic processing control unit 2 by an address converter 25 and is then driven by an address driver 26. Data constituting the command is first stored in a bus buffer 27 and then stored in the command buffer. The system address is read out by an address decoder 24 and transferred to a bus controller 23. The bus controller 23 operates to inform a central processing unit ( CPU ) 20 in the graphic processing control unit 2 of whether the bus master of the inner bus of the graphic processing control unit 2 resides in the CPU 20 or in a CPU of the graphic processing command unit 1. The graphic processing command is interpreted by the CPU 20 of the graphic processing control unit 2 and the command regarding the graphic element descriptions (lines, arcs, etc) is, in addition to the necessary parameters, transferred to a sub command buffer memory ( not shown ) of the line describing unit 30. The program necessary for the execution of the interpretation of the command in the graphic processing control unit 2 is stored in a program storing area ( ROM ) 21.

In the original graphic data registering unit 33 are stored data regarding the original graphics regarding such as the information of the position and dimensions of the transfer area TA, information of the position of the reference point RP of the transfer area TA and the like by the CPU 20 of the graphic processing control unit 2. A block diagram regarding the internal construction of the line describing unit 30 is substantially the same as that of the graphic processing command unit 2 and like reference numerals added to the blocks of the graphic processing control unit 2 are added to the block of the line describing unit 30 which attain substantially the same functions. The original graphics storing area 32 consists of a graphic address selector 320 and a graphic image registration area 321. A concrete graphic dot information description command of the original graphics transmitted from the sub-CPU 300 in the line describing unit 30 is supplied to the graphic image registration area 321. In this procedure, a determination is made as to what position of the graphic image registration area 321 the graphic dot information is described by interpreting the address information generated by the sub-CPU 300 using the graphic address selector 320.

The graphic processing command unit 1 sequentially generates a plurality of original graphics describing commands. (Step S1), an original graphic data registration command (Step S2) and an original graphic data transfer command (Step S3) as shown in FIG.8. The graphic processing control unit 2 receives the command outputted from the graphic processing command unit 1, and processes the commands at the steps S10 through S17 as shown in FIG.8. Namely, when the original graphics describing commands are inputted in the graphic processing control unit 2, the graphic dot information is stored in the original graphics storing area 32 through the line describing unit 30 (Steps S11 and S15). When the original graphic data transfer command is inputted in the graphic processing control unit 2, the original graphics is transferred from the original graphics storing area 32 to the video RAM 4 (Steps S12 and S16). Further, when the original graphic data registration command is inputted in the graphic processing control unit 2, the original graphic data is registered in the original graphic data registration unit 33.

As described hereinabove, in the conventional animated graphic processing method, a plurality of commands were required every time for erasing and describing the respective lines when shifting the graphic lines. However, according to the method of this invention, by only initially describing the graphic symbol once in the original graphic storing area, the shifting thereof is realized thereafter by one transfer command at a high processing speed of 3 to 5 times that of a conventional processing speed.

It should be understood that many modifications and adaptations of the invention will become apparent to those skilled in the art it is intended to encompass such obvious modifications and changes in the scope of the claims. appended hereto.

What is claimed is:

1. A method for processing animated graphics, the animation being effected by shifting displayed symbols, the method comprising the steps of:
    displaying a graphic symbol which is to be shifted on a display means so as to thereby effect animation, the displaying beingon the basis of display data preliminarily set in a video RAM:
    initially describing said graphic symbol in an original graphic storage area, wherein said graphic symbol is initially described only once in said original graphic storing areas;
    defining a transfer area including an area containing said graphic symbol initially described once in said original graphic storing area and further including a non-display area at the outer periphery thereof, wherein graphics contained within said transfer area are to be moved so as to effect animation; and
    entering data corresponding to said transfer area including said graphic symbol into said video RAM so that said graphic symbol is moved by a preselected distance on said display means, the movement of said graphic symbol thereby effecting animation.

2. A method according to claim 1, wherein said method further comprises the steps of inputting sizes or dimensions of said transfer area and a coordinate of a reference point of said transfer area by using a data inputting means and transferring the inputted size or dimension data and the inputted coordinate data into said video RAM respectively.

3. A method according to claim 1, wherein said transfer area is of a rectangular shape.

4. A method according to claim 1, wherein said display means is a CRT and wherein data transferred from said video RAM is displayed on the CRT.

5. A method according to claim 1, wherein said method further comprises the step of inputting at least one of original graphic describing commands and original graphic data registration commands and original graphic data transfer commands by using a data inputting means, wherein said oroginal graphics describing commands are defined to be commands used to enter original graphic data corresponding to an original graphic in said original graphic storing area and said oroginal graphic data registratin commands are defined to be commands used to register said original graphic data in an oriiginal graphic data registrtion area and said original graphic data transfer commands are defined to be commands used to transfer said original graphic data from said original graphic storing area to said video RAM.

6. A method according to claim 5, wherein said method further comprises the steps of determining if original graphic describing commands have been generated and if so, storing graphic dot information in the said original graphic storing area.

7. A method according to claim 5, wherein said method further comprises the steps of determining if original graphic describing commands have been generated and if not, determining if original graphic data transfer commands have been generated and if so, transferring said original graphic data to said original graphic storing area.

8. A method according to claim 5, wherein said method further comprises the steps of determining if original graphic describing commands have been generated and if not, determining if original graphic data transfer commands have been generated and if not, determining if original graphic data registration commands have been generated and if so, registering said original graphic data in said original graphic data registration unit.

* * * * *